United States Patent
Itoh et al.

(10) Patent No.: US 7,340,586 B2
(45) Date of Patent: Mar. 4, 2008

(54) DATA TRANSFER FOR DEBUGGING IN DATA DRIVEN TYPE PROCESSOR PROCESSING DATA PACKET WITH DATA FLOW PROGRAM INCLUDING TRANSFER CONTROL BIT SETTING INSTRUCTION

(75) Inventors: Yasufumi Itoh, Tenri (JP); Tsuyoshi Muramatsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 267 days.

(21) Appl. No.: 10/977,401

(22) Filed: Nov. 1, 2004

(65) Prior Publication Data
US 2005/0102490 A1    May 12, 2005

(30) Foreign Application Priority Data
Nov. 10, 2003   (JP)   ............................... 2003-380226

(51) Int. Cl.
G06F 11/30   (2006.01)
(52) U.S. Cl. ............................ 712/25; 712/227; 714/45
(58) Field of Classification Search ...................... None
See application file for complete search history.

(56) References Cited

U.S. PATENT DOCUMENTS

| | | | | |
|---|---|---|---|---|
| 5,165,036 A | * | 11/1992 | Miyata et al. | 712/25 |
| 5,511,215 A | * | 4/1996 | Terasaka et al. | 712/25 |
| 5,913,055 A | * | 6/1999 | Yoshida et al. | 712/233 |
| 6,959,004 B2 | * | 10/2005 | Takase et al. | 370/428 |
| 7,082,515 B2 | * | 7/2006 | Arakawa et al. | 712/25 |
| 2001/0037440 A1 | * | 11/2001 | Arakawa et al. | 712/25 |

FOREIGN PATENT DOCUMENTS

| | | |
|---|---|---|
| JP | 6-83731 A | 3/1994 |
| JP | 9-114664 A | 5/1997 |
| JP | 2001-306546 A | 11/2001 |

\* cited by examiner

Primary Examiner—Kenneth S. Kim
(74) Attorney, Agent, or Firm—Birch, Stewart, Kolasch & Birch, LLP

(57) ABSTRACT

A data-driven type information processor includes a ifinction processor manipulating contents in a data packet, a program storage unit storing a data flow program used by the function processor, and a branch unit controlling data flow whether to allow flow of a data packet within the processor or to provide the data packet to the outside thereof When a program is debugged, the portion of the program where a data packet is to be dumped (and checked) is directly designated by writing an instruction in a program that is stored in advance in the program storage unit. When the instruction code is encountered, the packet is dumped to the outside so that debugging of the program can be carried out by confirming the contents in the data packet that is output.

6 Claims, 12 Drawing Sheets

| AD | D11 | D12 | D13 | D14 | D21 | D22 | D23 | D24 |
|---|---|---|---|---|---|---|---|---|
| 0 | yes | MUL | n1 | L | no | – | – | – |
| 1 | yes | MUL | n1 | R | yes | MUL | n2 | R |

| AD | D11 | D12 | D13 | D14 | D21 | D22 | D23 | D24 |
|---|---|---|---|---|---|---|---|---|
| 0=n1 | yes | MUL | n2 | L | no | – | – | – |
| 1=n2 | yes | ADD | n3 | L | yes | SHF | n4 | L |
| 2=n3 | yes | out | 5,0 | L | no | – | – | – |
| 3=n4 | yes | NOP | n4 | L | no | – | – | – |

| AD | D41 | D42 |
|---|---|---|
| 0 | no | – |
| 1 | no | – |
| 2=n3 | yes | 3 |
| 3 | no | – |

FIG.14A PRIOR ART
FIG.14B PRIOR ART
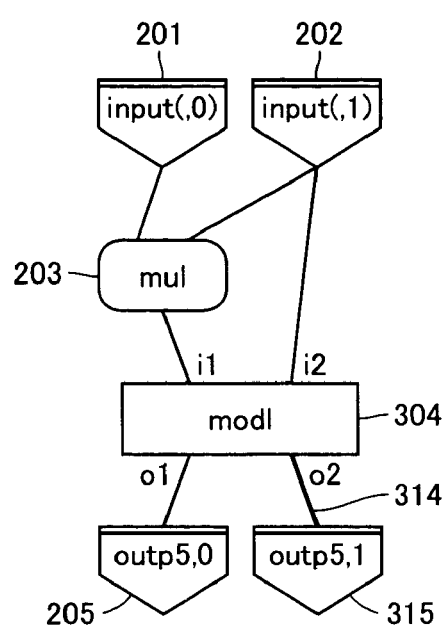
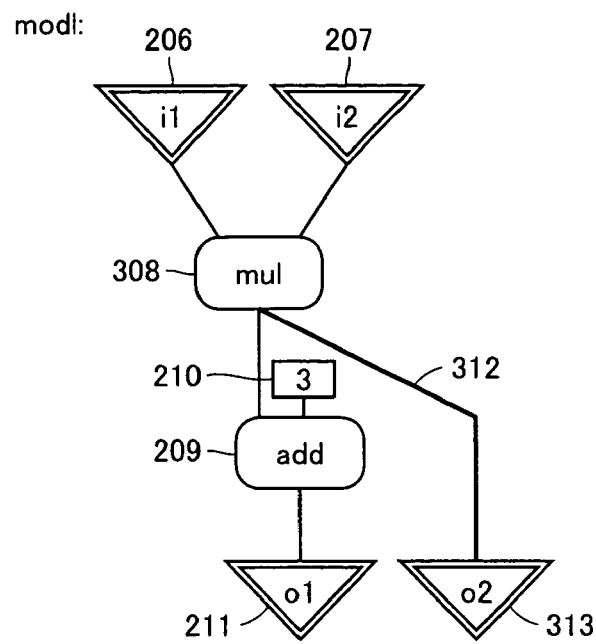

DATA TRANSFER FOR DEBUGGING IN DATA DRIVEN TYPE PROCESSOR PROCESSING DATA PACKET WITH DATA FLOW PROGRAM INCLUDING TRANSFER CONTROL BIT SETTING INSTRUCTION

This nonprovisional application is based on Japanese Patent Application No. 2003-380226 filed with the Japan Patent Office on Nov. 10, 2003, the entire contents of which are hereby incorporated by reference.

1. Field of the Invention

The present invention relates to a data-driven type information processor and a method of controlling execution of a data flow program, and more particularly to a data-driven type information processor attaining a function to provide to outside a data packet storing a result of operation while the program is being executed as well as a method of controlling execution of a data flow program.

2. Description of the Background Art

In recent days, high-speed processing of a large amount of data has been demanded in processing multimedia data including images. In particular in processing image data, execution of a large amount of operations at high speed has been demanded. In order to meet such a demand, a data-driven type information processor has been proposed. In a data-driven type information processor, a processing proceeds in accordance with a rule that the processing is executed when all data necessary for a certain processing are available and resources necessary for the processing such as an arithmetic unit are allocated. As a data processor in accordance with a data-driven type information processing operation, a data transmitter adopting asynchronous handshaking is employed. In such a data transmitter, a plurality of data transmission paths are sequentially connected, and the data transmission paths transmit and receive a data transfer request signal (hereinafter, referred to as SEND signal) and a transfer permission signal (hereinafter, referred to as ACK signal) indicating whether data transfer is permitted or not, so as to perform autonomous data transfer.

FIG. 7 shows a block configuration of a conventional data-driven type information processor. In FIG. 7, a data-driven type information processor Pe includes a junction unit 109, a firing control unit 106, a function processor 102, a program storage unit 104 storing a data flow program, a branch unit 105, a plurality of pipeline registers 4a to 4c for data transfer among these components, and C elements 2a to 2c provided corresponding to pipeline registers 4a to 4c respectively. A data packet is input from the left side of data-driven type information processor Pe in the drawing and output to the right thereof.

Respective ones of C elements 2a to 2c output clock pulses CP for latching data in a corresponding pipeline register through transmission and reception of a packet transfer pulse (signals CI, CO, RI, and RO) with the C element in a preceding stage (C element on the left side in the drawing) and the C element in a subsequent stage (C element on the right side in the drawing). Respective ones of pipeline registers 4a to 4c take in and hold data provided from processing units (firing control unit 106, function processor 102, program storage unit 104) in the preceding stage in response to an input of clock pulse CP from corresponding C element, output the data to an output stage, and hold the data until next clock pulse CP is input. Data transfer from/to the processing units (firing control unit 106, function processor 102, program storage unit 104) is thus controlled.

FIG. 8 shows a structure of a data packet flowing in the data-driven type information processor applied to a conventional example and the present invention. A data packet 110 in FIG. 8 includes a field F1 for storing an instruction code 111, a field F2 for storing destination information 112, a field F3 for storing an HST flag (host transfer flag) 113, a field F4 for storing a CTL flag 114, and a field F5 for storing data 115 such as operand data.

Instruction code 111 is decoded by function processor 102. A result of decoding instructs operation contents in function processor 102. Destination information 112 serves to specify a destination of data packet 110. HST flag 113 is set to 0 or 1. Upon receiving data packet 110, branch unit 105 refers to HST flag 113 of received data packet 110. When HST flag 113 is set to 0 as a result of reference, data packet 110 is provided to junction unit 101 or to the outside of data-driven type information processor Pe in accordance with destination information 112. If HST flag 113 is set to 1, data packet 110 is unconditionally provided to the outside. Though CTL flag 114 has conventionally been used in a special mode such as when a data flow program is transferred from the outside to program storage unit 104 or when the data flow program is read from program storage unit 104 to the outside of the data-driven type information processor, CTL flag 114 is not referred to during a normal program execution operation. In other words, CTL flag 114 is the information unused and it is set to '0'. In the present invention, CTL flag 114 is utilized for distinguishing between instructions, which will be described in detail later.

When data packet 110 is input to data-driven type information processor Pe in FIG. 7, input data packet 110 first passes through junction unit 101 and is provided to firing control unit 106. When firing control unit 106 detects reception of two different data packets 110 having the same destination information 112 based on destination information 112 of input data packet 110, it adds and stores data 115 of one detected data packet 110 in field F5 of the other data packet 110, and outputs the other data packet 110 to function processor 102. Here, a data packet is waited in order to detect data to be paired. If it is determined that instruction code 111 of the received data packet is the instruction code requiring two pieces of operand data such as a binary operation instruction, data is waited, and otherwise the received data packet is output as it is.

Function processor 102 receives provided data packet 110, subjects contents in received data packet 110 to a prescribed operation based on instruction code 111 of received data packet 110, stores a result of operation as data 115 in field F5 of received data packet 110, and outputs received data packet 110 to program storage unit 104.

Upon receiving provided data packet 110, program storage unit 104 reads subsequent destination information 112 and subsequent instruction code 111 from a data flow program stored in advance in program storage unit 104 based on destination information 112 of received data packet 110, stores read destination information 112 and instruction code 111 in fields F2 and F1 of received data packet 110 respectively, and outputs received data packet 110 to branch unit 105.

Upon receiving data packet 110, branch unit 105 either provides received data packet 110 to the outside of the processor based on destination information 112 or outputs the same again to junction unit 101 for processing within the processor.

FIG. 9 shows a configuration of a data transmission path in data-driven type information processor Pe shown in FIG. 7. The data transmission path includes a C element 3a (a self-synchronous transfer control circuit) and a pipeline register 3b (a data holding circuit consisting of D-type flip flops). C element 3a corresponds to C elements 2a to 2c in FIG. 7 respectively, and pipeline register 3b corresponds to pipeline registers 4a to 4c in FIG. 7 respectively. C element 3a has a pulse input terminal CI receiving a pulse, a transfer permission output terminal RO outputting a transfer permission signal indicating permission or prohibition of transfer, a pulse output terminal CO outputting a pulse, a transfer permission input terminal RI receiving a transfer permission signal indicating permission or prohibition of transfer, and a pulse output terminal CP for providing a clock pulse controlling a data holding operation of pipeline register 3b.

FIG. 10 is a timing chart illustrating an operation of the C element shown in FIG. 9. Upon receiving a pulse signal shown in FIG. 10 from terminal CI, C element 3a outputs a pulse shown in FIG. 10 from terminal CO if a transfer permission signal as shown in FIG. 10 input to terminal RI is in a permission state, and outputs a pulse shown in FIG. 10 from terminal CP to pipeline register 3b. Pipeline register 3b receives and holds the provided data packet in response to the pulse provided from C element 3a, and outputs the held data packet.

FIG. 11 shows an example of sequential connection of the data transmission paths shown in FIG. 9 through a prescribed logic circuit. Data-driven type information processor Pe shown in FIG. 7 includes the data transmission path shown in FIG. 11. In FIG. 11, input data packets are sequentially processed by logic circuits 6a and 6b while it is transferred through the pipeline registers in the order of pipeline register 4a→4b→4c. For example, if pipeline register 4a is holding the data packet and if pipeline register 4b in the subsequent stage is in a data packet holding state, the data packet is not transmitted from pipeline register 4a to pipeline register 4b.

In addition, if pipeline register 4b in the subsequent stage is not holding the data packet or it enters a state not holding the data packet, the data packet is provided from pipeline register 4a to logic circuit 6a taking at least a pre-set delay time, followed by processing in logic circuit 6a, and reaches pipeline register 4b. In this manner, data transmission is performed taking at least a pre-set delay time in an asynchronous manner, in accordance with SEND signal input/output through the CI terminal and the CO terminal to/from the adjacent pipeline register connected as described above and ACK signal input/output through the RI terminal and the RO terminal. Such control is called self-synchronous transfer control, and a circuit for applying self-synchronous transfer control is called a self-synchronous transfer control circuit.

FIG. 12 specifically shows a circuit of the C element shown in FIG. 9. For example, Japanese Patent Laying-Open No. 06-083731 discloses such a circuit. In FIG. 12, when pulse input terminal CI receives SEND signal (transfer request signal) which is a pulse signal from the preceding stage (on the left in the drawing), transfer permission output terminal RO outputs ACK signal (transfer permission signal) to the preceding stage. Pulse output terminal CO outputs SEND signal which is a pulse signal to the subsequent stage (on the right in the drawing), and transfer permission input terminal RI receives ACK signal from the subsequent stage.

A master reset input terminal MR receives a master reset signal which is a pulse signal. When master reset input terminal MR receives a master reset signal at "H" level, the master reset signal is inverted by an inverter 5f, and thereafter provided to flip-flops 5a and 5b. Accordingly, flip flops 5a and 5b are reset, and consequently C element 3a is initialized. Here, pulse output terminal CO and transfer permission output terminal RO both output a signal at "H" level as an initialized state. The "H" level of the output signal from transfer permission output terminal RO indicates a transfer permission state, whereas the "L" level thereof indicates a transfer prohibition state. The "H" level of the output from pulse output terminal CO indicates a state where data transfer is not requested to the subsequent stage, whereas the "L" level thereof indicates a state where data transfer is being requested or data is being transferred to the subsequent stage.

When a signal of "L" level is input to pulse input terminal CI, that is, when data transfer is requested from the preceding stage, flip flop 5a is set and outputs a signal of "H" level to its output Q. As this "H" level signal is inverted by an inverter 5g, a signal of "L" level is output to the preceding stage from transfer permission output terminal RO, so as to prohibit further data transfer from the preceding stage. After a certain period of time has passed, a signal of "H" level is input to pulse input terminal CI, and setting of data from the preceding stage to C element 3a is completed. In such a state and if a signal of "H" level is input from the subsequent stage to transfer permission input terminal RI, that is, in a state where data transfer to the subsequent stage is permitted, and pulse output terminal CO outputs a signal of "H" level, that is, in a state where data is not being transferred to the subsequent stage (data transfer is not requested to the subsequent stage), an NAND gate 5c is activated and outputs an "L" level signal.

As a result, flip flops 5a and 5b are both reset, and flip flop 5b outputs a signal of "H" level from pulse output terminal CP to pipeline register 3b through a delay element 5e. Along with this output, SEND signal at "L" level is output from pulse output terminal CO to the C element in the subsequent stage through a delay element 5d, that is, data transfer is requested to the subsequent stage. The C element in the subsequent stage that has received SEND signal at "L" level sets ACK signal indicating transfer prohibition to "L" level so as not to allow further data transfer to the C element, and outputs the ACK signal from the RO terminal. When C element 3a receives ACK signal at "L" level through transfer permission input terminal RI, flip flop 5b is set in response to that signal. As a result, the "L" level signal is output from pulse output terminal CP to pipeline register 3b through delay element 5e, and SEND signal at "H" level is output from pulse output terminal CO to the subsequent stage through delay element 5d. Consequently, data transfer ends.

Here, when a program is debugged using an actual data-driven type information processor (hereinafter, referred to as actual machine debugging) for a system using data-driven type information processor Pe, a data packet passing (flowing) through a designated portion in the program is monitored. Alternatively, it is effective to dump contents in a data packet storing a result of operation while a program is being executed (hereinafter, referred to as data packet dumping). In the conventional data-driven type information processor, however, data packet dumping has not been simple.

For example, a program indicated in a data flow graph as in FIG. 13A is assumed as a target of actual machine debugging. This data flow graph includes input nodes 201 and 202 for data packet input, nodes 203 and 204 for operation, and an output node 205 for data packet output. Lines connecting respective nodes indicate paths through which a data packet flows. An instruction code 'mul' for multiplication performed in function processor 102 in data-driven type information processor Pe is allocated to node 203, while a module 'modl' representing a sub program is allocated to node 204.

FIG. 13B shows a result of development of the sub program allocated to module node 204 in FIG. 13A into the data flow graph. The data flow graph includes formal input nodes 206 and 207, a node 208 having instruction code 'mul' allocated, a node 209 having an instruction code for addition 'add' allocated, a node 210 having a constant ('3') allocated, and a formal output node 211.

Here, it is assumed that a request to analyze an operation by obtaining a result of dumping of the data packet passing through a portion in the sub program shown with an arrow 212 in order to perform actual machine debugging of the program shown in FIGS. 13A and 13B has been issued.

For example, according to the data-driven type information processor disclosed in Japanese Patent Laying-Open No. 09-114664, data is provided to outside from a designated portion in the program in order to dump a data packet for actual machine debugging. It has been necessary, however, to prepare a special path for data output in the designated portion in the program.

In addition, in an apparatus disclosed in Japanese Patent Laying-Open No. 2001-306546, though a data packet is dumped, a data packet to be dumped is limited. More specifically, noting a hardware configuration of a data-driven type information processor, this apparatus dumps a data packet that has reached a specific portion in the hardware (a portion where a host transfer flag manipulation circuit is input to a pipeline register).

In the dumping method disclosed in Japanese Patent Laying-Open No. 09-114664, in addition to modification of a portion in the program at which dumping result is desirably obtained, it has been necessary to modify another portion in the program, which will be described with reference to FIGS. 14A and 14B.

In the data flow graph in FIG. 14B, a path 312 for dumping the data packet passing through a portion shown with arrow 212 in the data flow graph in FIG. 13B has specially been provided. Path 312 is provided in order to output a data packet supplied from a node 308 to a newly provided formal output node 313. As can be seen from FIGS. 13B and 14B, in order to dump a data packet passing through the portion shown with arrow 212, an instruction of node 208 is modified to an instruction attaining a function to allow output of the data packet also to path 312, and formal output node 313 is newly added to the program. In addition, as can be seen from FIGS. 13A and 14A, an instruction of node 204 is modified to a node 304 for an instruction to allow output of a data packet also to a path 314, and a node 315 and path 314 for providing the data packet output to node 313 to the outside are added to the program.

When modification to the program for debugging the program is required as in the example above, a procedure for such modification becomes necessary and a bug due to human error is more likely. Therefore, a target of debugging is changed from an original program to a program after modification as described above, which makes it difficult to achieve an initial object of program debugging. Though FIGS. 13A and 13B show an example of a two-layered configuration of a "top program-sub program" for the sake of simplification, in fact, a program executed in the data-driven type information processor often includes a configuration of three or more layers. Accordingly, such a problem will be more likely.

Japanese Patent Laying-Open No. 2001-306546 is directed to the method of dumping a data packet that has reached a specific portion in the hardware. As the specific portion should be designed in advance in a fixed manner at the time of hardware design, change of a portion at which dumping is desired is not allowed after the hardware configuration is completed. In addition, as the specific portion for dumping does not directly correspond to a position in the program, this method has been difficult to use in dumping for program debugging. Moreover, a control unit identifying and handling a data packet for instructing dumping of a data packet and a data packet to be dumped should newly be added to the data-driven type information processor. Though such a function is used only for program debugging, attaining this function is burdensome in the data-driven type information processor, i.e., expensive and not realistic.

SUMMARY OF THE INVENTION

An object of the present invention is to provide a data-driven type information processor capable of readily obtaining a result of operation while a data flow program is being executed as well as a method of controlling execution of the data flow program.

In order to achieve the object described above, a data-driven type information processor according to one aspect of the present invention receives a data packet having an instruction field storing instruction information, a destination field storing destination information and data field storing data, and executes an operation in accordance with a data flow program. The data-driven type information processor includes: a program storage unit receiving the data packet, reading subsequent destination information and subsequent instruction information from the data flow program stored in advance by addressing based on the destination information of the received data packet, storing the subsequent destination information and the subsequent instruction information in the destination field and the instruction field of the received data packet respectively, and outputting the received data packet; a firing control unit receiving the data packet, detecting paired data based on the instruction information of the received data packet, storing data pair in the data field of the received data packet and outputting the received data packet or outputting the received data packet as it is; a function processor receiving the data packet from the firing control unit, decoding the instruction information of the received data packet, subjecting contents in the received data packet to an operation processing based on a result of decoding, storing a result of the operation in the received data packet, and outputting the received data packet to the program storage unit; and an input/output unit providing the received data packet to the outside of the data-driven type information processor or to the firing control unit based on the contents in the data packet received from the program storage unit. The data packet further stores control information. The data flow program includes instruction information indicating a packet output instruction for holding the contents in the data packet and providing the data packet to the outside of the data-driven type information processor. The function processor has a packet output instruction processing unit setting the control information of the received data packet such that transfer is instructed as the operation processing for the instruction information indicating the packet output instruction of the received data packet. The input/output unit provides the received data packet to the outside when the control information of the received data packet indicates transfer.

Therefore, the control information of the data packet storing the instruction information indicating the packet output instruction as the subsequent instruction information is set so as to instruct transfer by the packet output instruction processing unit in the function processor, and the data packet of which control information is set so as to instruct transfer is provided to the outside through the input/output unit.

Accordingly, the contents in the data packet provided to the outside of the processor in accordance with the control information indicates a result of execution of the processing in the data-driven type information processor in accordance with a series of instruction information read before reading of the instruction information of the packet output instruction. Therefore, by describing the instruction information indicating the packet output instruction in a desired portion in the data flow program, the result of operation while the program is being executed at that portion can readily be obtained as the contents in the data packet provided to the outside, and debugging based on the obtained contents is also facilitated.

In addition, even if there are a plurality of desired portions, it is only necessary to describe the instruction information indicating the packet output instruction in the plurality of desired portions in the data flow program respectively. Therefore, it is not necessary to rewrite the whole program, thereby facilitating actual machine debugging. In this manner, debugging of a plurality of portions can readily be performed.

Moreover, what is called a packet dump function, that is, output of the data packet with the result of operation while the program is being executed being held, can be attained by executing a processing in accordance with a normal instruction code that can be used in the data flow program.

Preferably, the firing control unit outputs the received data packet as it is when the instruction information of the received data packet indicates the packet output instruction.

Therefore, since the data packet storing the instruction information indicating the packet output instruction passes through the firing control unit as it is, increase in load associated with detection of paired data can be avoided even when the data packet flows through the data-driven type information processor.

Preferably, the program storage unit reads a plurality of pieces of subsequent instruction information including instruction information indicating the packet output instruction and a plurality of pieces of subsequent destination information by one addressing, and outputs a plurality of the received data packets storing the plurality of pieces of the subsequent instruction information that have been read and the plurality of pieces of the subsequent destination information that have been read in the instruction field and the destination field respectively. The plurality of pieces of instruction information that have been read include instruction information indicating the packet output instruction.

Therefore, a plurality of pieces of subsequent instruction information including the instruction information indicating the packet output instruction can be read by one addressing. Accordingly, even if the instruction information indicating the packet output instruction is included in the data flow program, increase in the number of operations for reading from the data flow program and special preparation of the data packet for reading the instruction information indicating the packet output instruction for flow through the processor can be avoided.

Preferably, the packet output instruction is categorized into a plurality of types. The control information includes identification data for identifying a type of the packet output instruction of the data packet. The packet output instruction processing unit sets the identification data of the received data packet in accordance with the type of the packet output instruction indicated by the result of decoding of the instruction information of the received data packet.

Therefore, the data packet storing the packet output instruction of any type is provided to the outside of the data-driven type information processor based on the control information. In addition, a type of the packet output instruction of the data packet that has been provided to the outside can be identified based on the identification data of the control information.

Preferably, the outside serving as output destination is implemented by a readable storage device receiving and storing the provided data packet. Therefore, by reading and confirming the storage contents in the storage device, the contents in the data packet storing the packet output instruction, that is, the result of dumping, can readily be confirmed.

Preferably, the outside serving as the output destination is implemented by a plurality of readable storage devices adapted to respective ones of the plurality of types of packet output instructions.

Therefore, the device storing the data packet that has been provided to the outside can be provided separately for each type of the packet output instruction. In addition, as each storage device is readable, the contents in the data packet stored therein can be read and confirmed.

Accordingly, the contents in the data packet passing through the portion having the instruction information of one type of packet output instruction described and the contents in the data packet passing through the portion having the instruction information of another type of packet output instruction described can be stored in the data flow program in a manner distinguished from each other. Therefore, different types of packet output instructions are described in portions in the program having different purposes of data packet dumping respectively, whereby each storage device can store the result of data packet dumping for each purpose of dumping.

In order to achieve the object described above, a method of controlling execution of a data flow program according to another aspect of the present invention is a method of controlling execution of a data flow program in a data-driven type information processor receiving a data packet having an instruction field storing instruction information, a destination field storing destination information and data field storing data, and executing an operation in accordance with the data flow program. The data-driven type information processor includes: a program storage unit receiving the data packet, reading subsequent destination information and subsequent instruction information from the data flow program stored in advance by addressing based on the destination information of the received data packet, storing the subsequent destination information and the subsequent instruction information in the destination field and the instruction field of the received data packet respectively, and outputting the received data packet; a firing control unit receiving the data packet, detecting paired data based on the instruction information of the received data packet, storing data pair in the data field of the received data packet and outputting the received data packet or outputting the received data packet as it is; a function processor receiving the data packet from the firing control unit, decoding the instruction information of the received data packet, subjecting contents in the received data packet to an operation processing based on a result of decoding, storing a result of the operation in the received data packet, and outputting the received data packet to the program storage unit; and an input/output unit providing the received data packet to the outside of the data-driven type information processor or to the firing control unit based on the contents in the data packet received from the program storage unit. The data packet further stores control information. The data flow program includes instruction information indicating a packet output instruction for holding the contents in the data packet and providing the data packet to the outside of the data-driven type information processor. The function processor has a packet output instruction processing unit setting the control information of the received data packet such that transfer is instructed as the operation processing for the instruction information indicating the packet output instruction of the received data packet. The method of controlling execution of the data flow program includes: packet output instruction processing step of setting a transfer flag of the received data packet to a set state as the operation processing in accordance with indication of the packet output instruction by the result of decoding of the instruction information of the received data packet in the function processor; and the step of providing the received data packet to the outside in accordance with indication of transfer by the control information of the received data packet in the input/output unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A to 4C illustrate data flow programs and constants stored corresponding to FIGS. 3A to 3C respectively.

FIGS. 14A and 14B show flow graphs when the flow graphs in FIGS. 13A and 13B are debugged respectively.

DESCRIPTION OF THE PREFERRED EMBODIMENTS

In the following, an embodiment of the present invention will be described in detail with reference to the figures. Here, HST flag 113 and CTL flag 114 are employed as information for controlling debugging of an actual machine.

Figure 1:
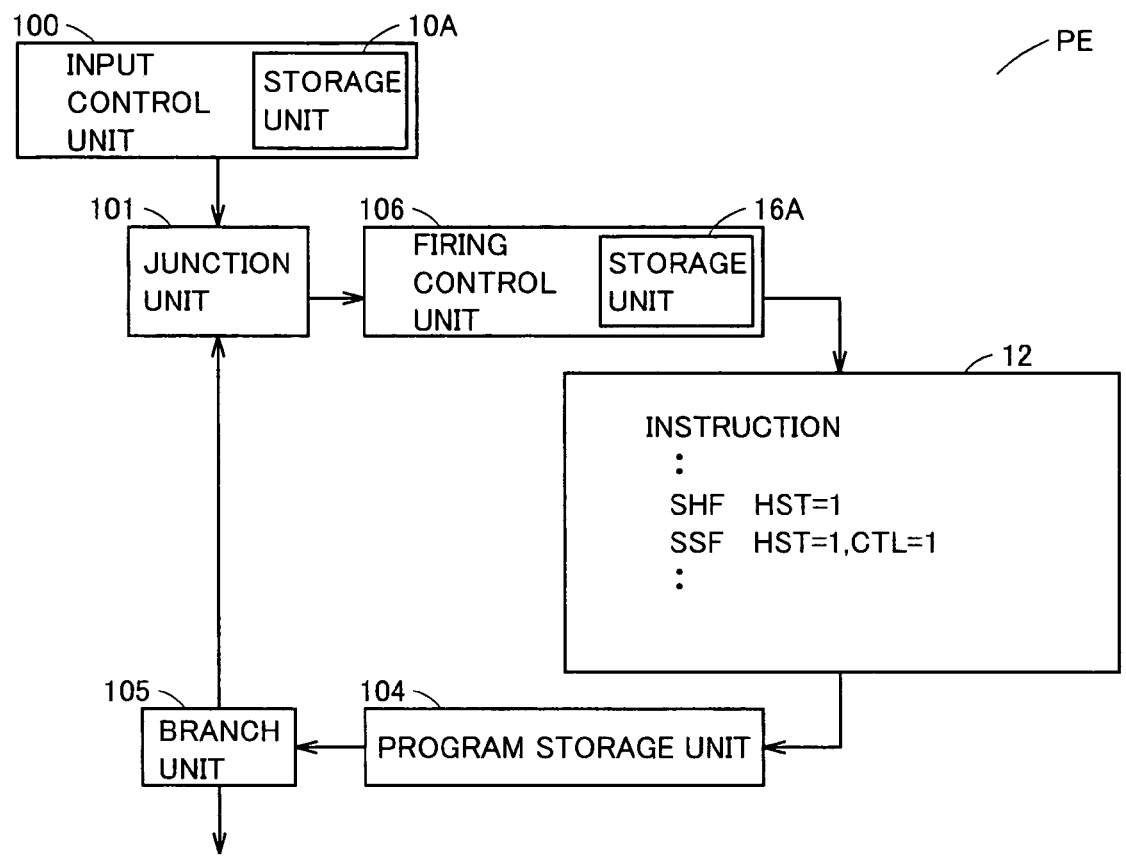
FIG. 1 is a block diagram showing a configuration of a data-driven type information processor PE according to the present embodiment.
Figure 7:
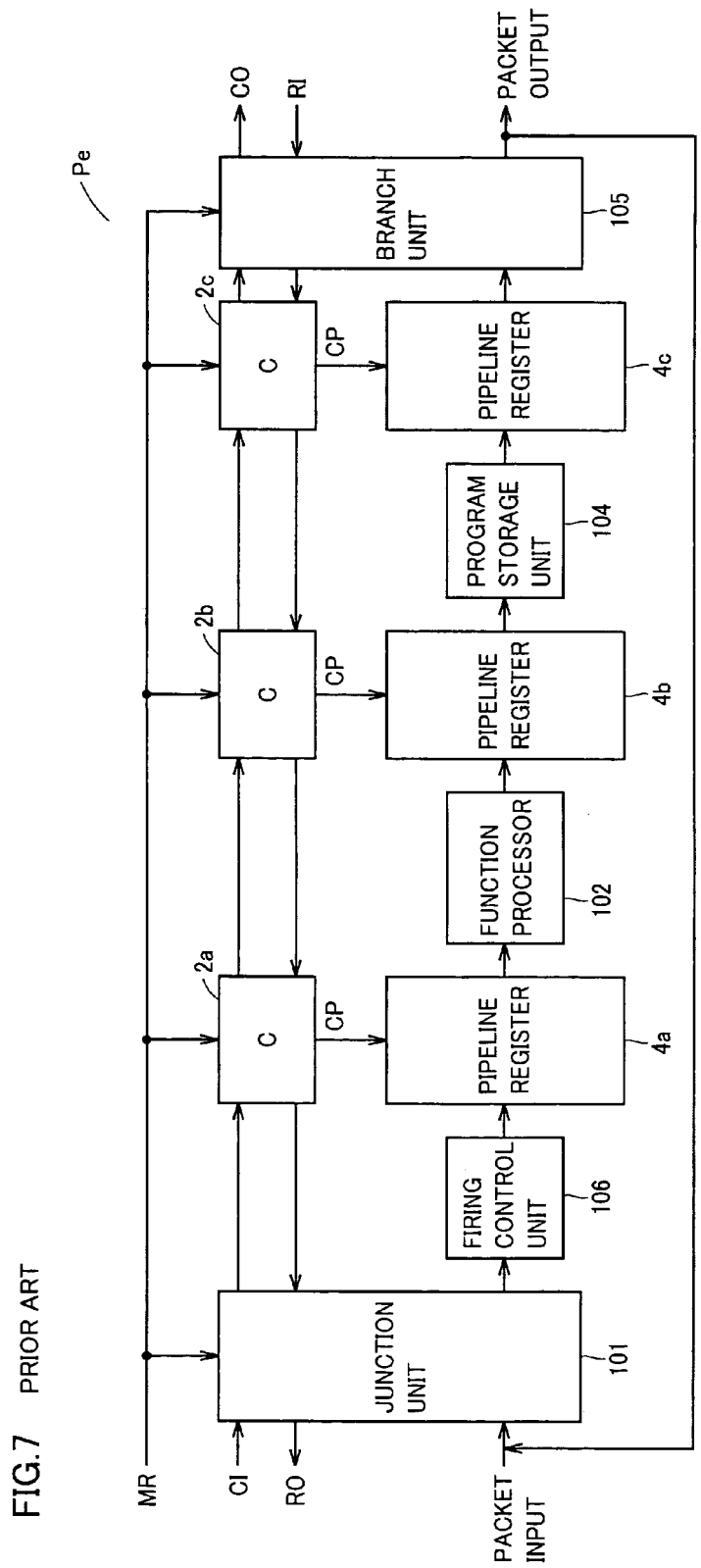
FIG. 7 is a block diagram showing a configuration of a conventional data-driven type information processor.
Figure 8:
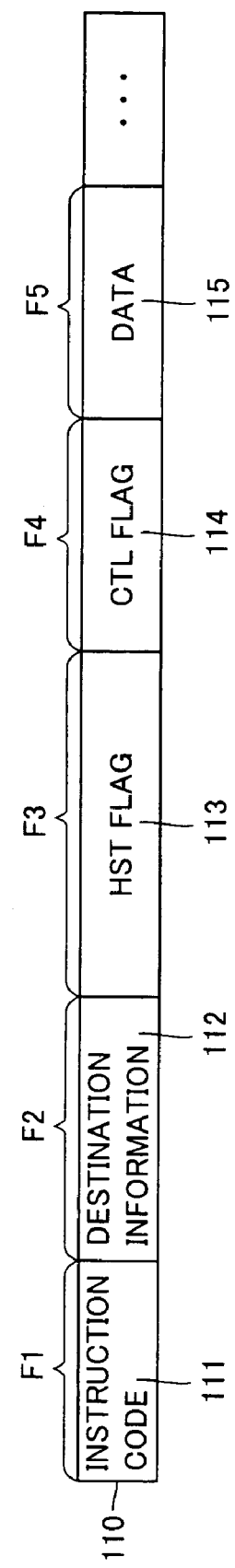
FIG. 8 shows a structure of a data packet applied to a conventional example and the present invention.
Figure 9:
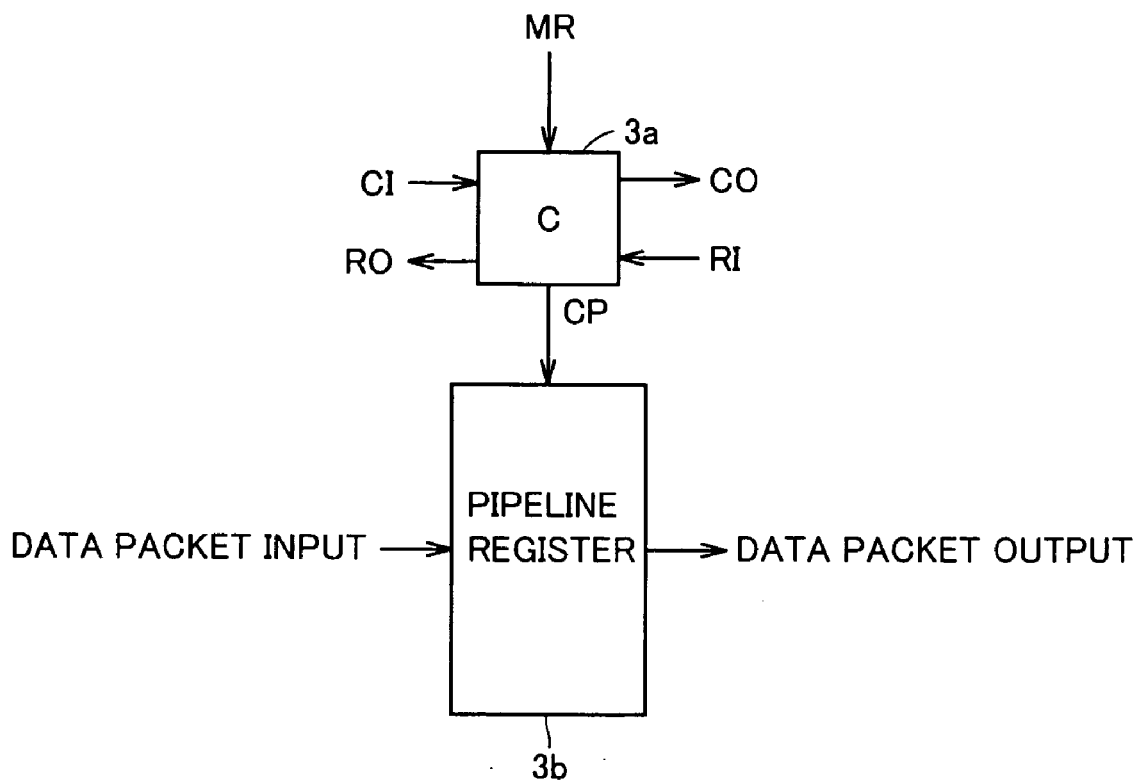
FIG. 9 shows a configuration of a data transmission path in the data-driven type information processor shown in FIG. 7.
Figure 10:
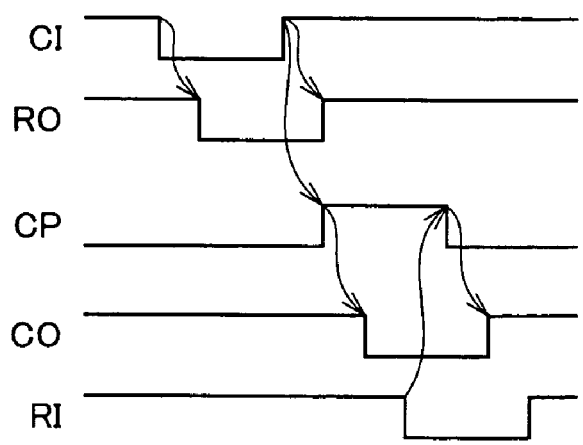
FIG. 10 is a timing chart illustrating an operation of a C element shown in FIG. 9.
Figure 11:
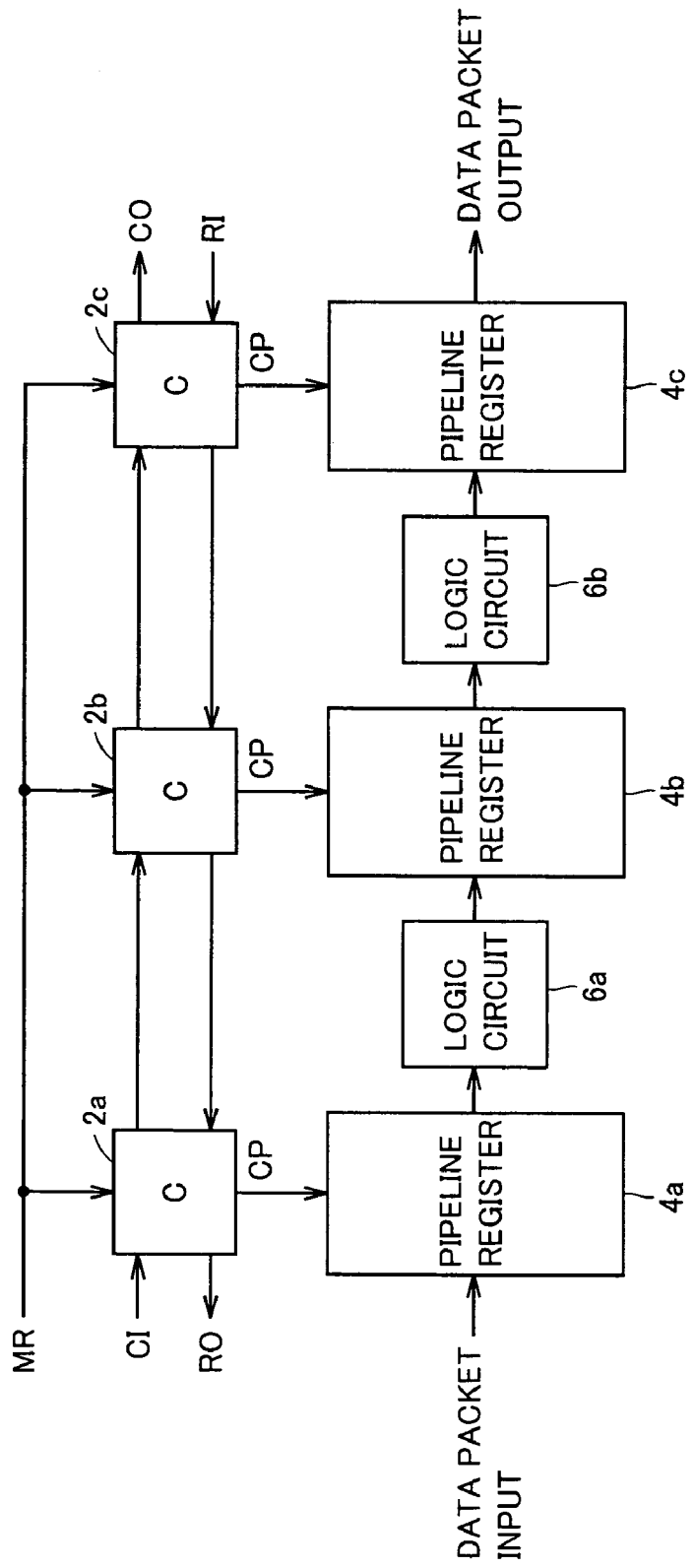
FIG. 11 shows an example of sequential connection of the data transmission paths shown in FIG. 9 through a prescribed logic circuit.
Figure 12:
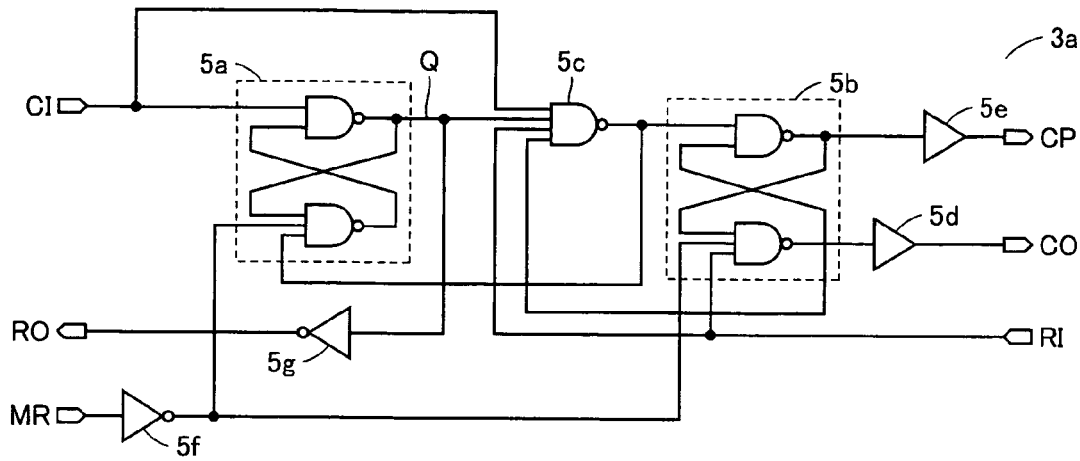
FIG. 12 specifically shows a circuit diagram of the C element shown in FIG. 9.

When a data-driven type information processor PE according to the present embodiment in FIG. 1 is compared with conventional data-driven type information processor Pe in FIG. 7, there is a difference in that conventional function processor 102 has been improved to a function processor 12. Junction unit 101, firing control unit 106, program storage unit 104, and branch unit 105 attain functions and configurations the same as in the conventional example, respectively. In FIG. 1, an input control unit 100 for input of data packet 110 to data-driven type information processor PE is provided. Input control unit 100 has a storage unit 10A for storing a program in advance, while firing control unit 106 has a storage unit 16A for storing in advance data of constants necessary in program execution.

For the sake of simplification, data transfer control lines among respective components that have been shown in the conventional art are not shown in data-driven type information processor PE in FIG. 1, however, data packet 110 is transferred between components in accordance with the self-synchronous transfer control, as in the conventional example.

Figure 2:
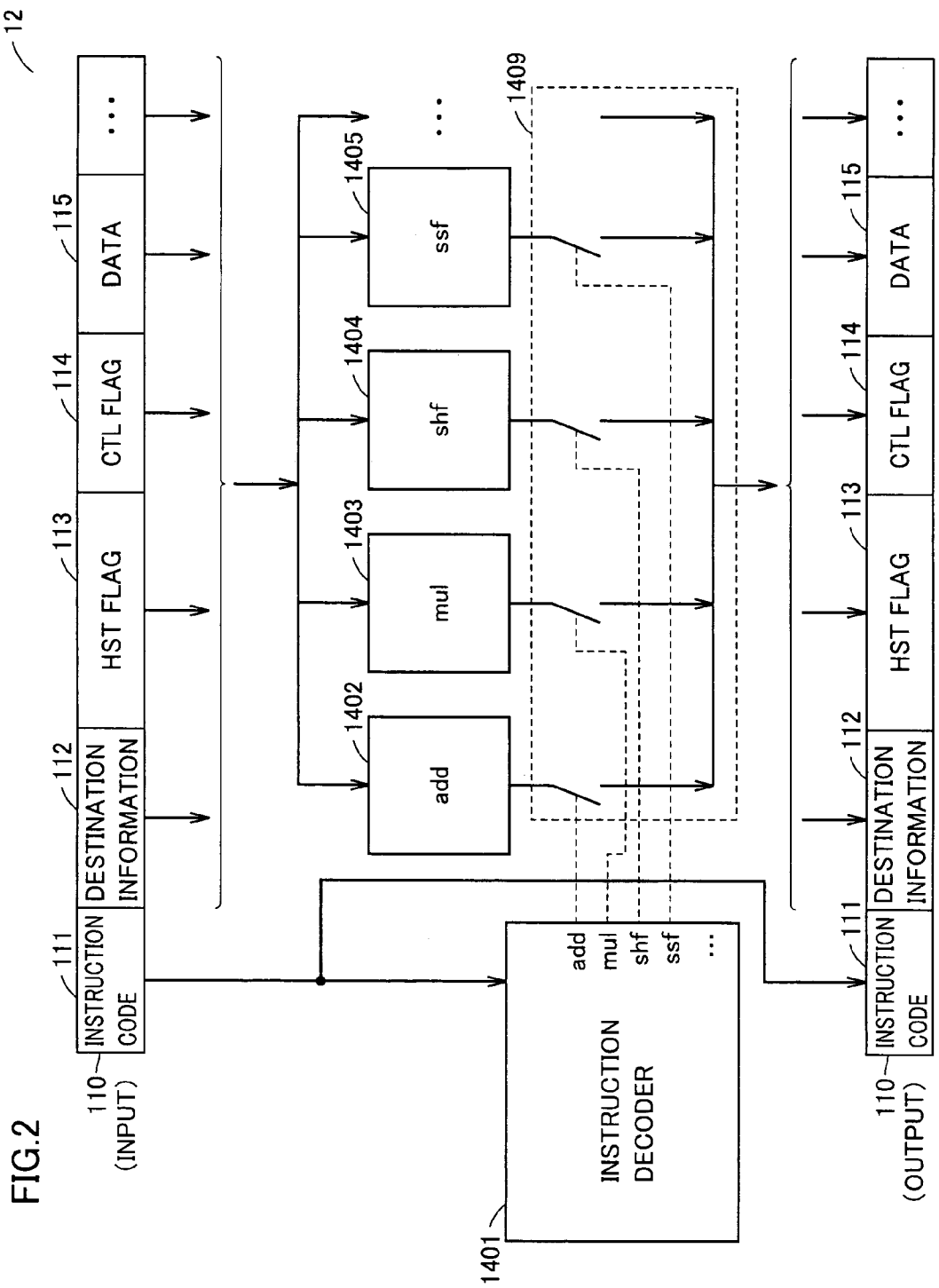
FIG. 2 shows an internal configuration of a function processor according to the present embodiment.

As schematically shown in FIG. 1, function processor 12 attains a function to process instruction codes SHF and SSF characterizing the present invention, in addition to the function to process the instruction codes of a type the same as those in the conventional example (such as an arithmetic operation instruction, a logical operation instruction, or the like). FIG. 2 shows an internal configuration of function processor 12.

Referring to FIG. 2, function processor 12 includes an instruction decoder 1401, an operation unit 1402 performing an operation in accordance with an addition instruction code ('add'), an operation unit 1403 performing an operation in accordance with a multiplication instruction code ('mul'), an operation unit 1404 performing an operation in accordance with instruction code SHF, an operation unit 1405 performing an operation in accordance with instruction code SSF, and a selector 1409. Though function processor 12 includes a plurality of operation units, the types of instruction codes processed in these operation units are not limited to those enumerated here.

When function processor 12 receives data packet 110, instruction code 111 of received data packet 110 is provided to instruction decoder 1401, while destination information 112, HST flag 113, CTL flag 114, and data 115 are provided to all operation units 1402 to 1405. Respective ones of operation units 1402 to 1405 use provided destination information 112, HST flag 113, CTL flag 114, and data 115 so as to perform their own operations, and output destination information 112, HST flag 113, CTL flag 114, and data 115 indicating results of executed operations. When addition instruction code 'add' is given, a result of addition using data 115 of received data packet 110 is output as data 115. When multiplication instruction code 'mul' is given, a result of multiplication using data 115 of received data packet 110 is output as data 115.

In contrast, operation unit 1404 for instruction code SHF sets HST flag 113 out of provided destination information 112, HST flag 113, CTL flag 114, and data 115 to '1' for output, and outputs items other than HST flag 113 as they are. In addition, operation unit 1405 for instruction code SSF sets HST flag 113 and CTL flag 114 out of provided destination information 112, HST flag 113, CTL flag 114, and data 115 to '1' for output, and outputs items other than HST flag 113 and CTL flag 114 as they are. Instruction decoder 1401 determines a type of provided instruction code 111, and controls selector 1409 based on a result of determination. When instruction decoder 1401 determines the type of the instruction code as the 'add' instruction, selector 1409 selects the output from operation unit 1403 When instruction decoder 1401 determines the type of the instruction code as the 'mul' instruction, selector 1409 selects the output from operation unit 1404. When instruction decoder 1401 determines the type of the instruction code as instruction code SHF, selector 1409 selects the output from operation unit 1405. When instruction decoder 1401 determines the type of the instruction code as instruction code SSF, selector 1409 selects the output from operation unit 1404. The selected output is stored in fields F2 to PS of data packet 110 for output, and instruction code 111 of received data packet 110 is stored as instruction code 111 of output data packet 110 as it is. After the operation is completed, output data packet 110 is provided from function processor 12 to program storage unit 104.

In this manner, when instruction code SHF or SSF is executed, data packet 110 still holding the contents in at least fields F1, F2 and F5 of received data packet 110, that is, data packet 110 still holding a state (information) during the operation in data-driven type information processor PE can be obtained as data packet 110 output from function processor 12.

Here, CTL flag 114 is normally set to '0'. Therefore, if CTL flag 114 in data packet 110 output from function processor 12 is set to '1', it can be seen that the data packet represents a data packet obtained as a result of execution of instruction code SSF.

In data-driven type information processor PE, when a program is debugged, a portion in the program where a data packet is to be dumped can directly be designated by writing instruction code SHF or SSF in the program stored in advance in program storage unit 104, which will be described with reference to FIGS. 3A to 3C and FIGS. 4A to 4C.

Figure 3A:
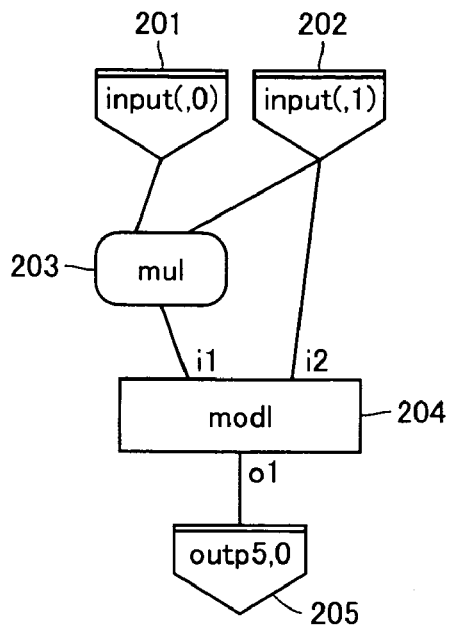
FIGS. 3A to 3C illustrate data flow graphs according to the present embodiment respectively.
Figure 3B:
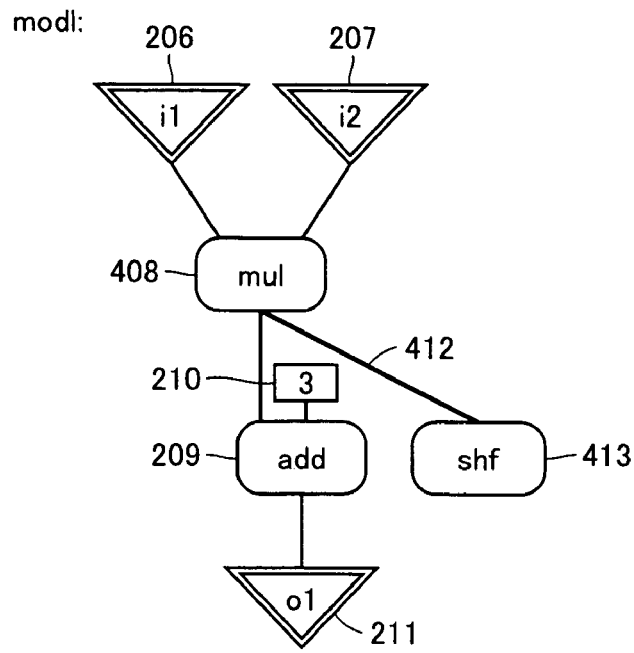
Figure 13A:
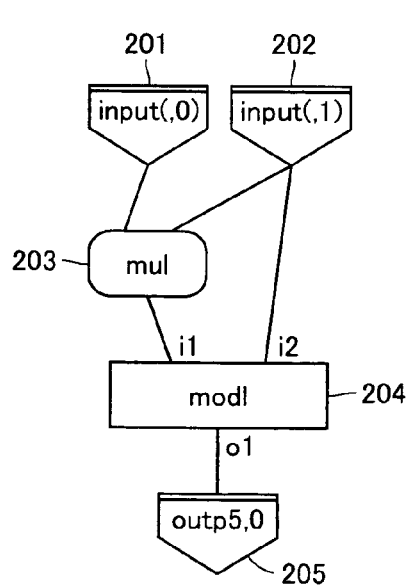
FIGS. 13A and 13B show examples of conventional data flow graphs respectively.
Figure 13B:
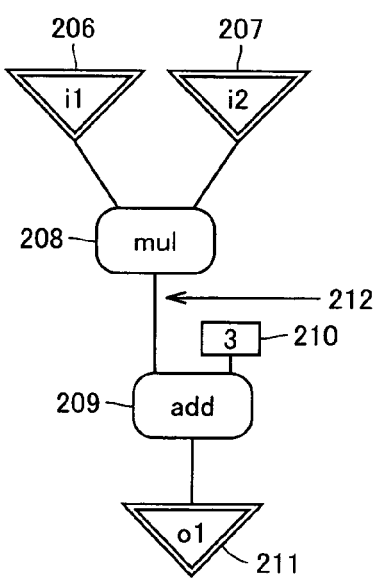

In the present embodiment, in order to dump data packet 110 passing through the portion shown with arrow 212 for debugging the same program as shown in FIGS. 13A and 13B, a path 412 as shown in FIGS. 3A and 3B is added so as to add a node 413 to which instruction code SHF is allocated. It can be seen that modification to FIGS. 3A and 3B is minor, as compared with that to FIGS. 14A and 14B.

The program and data corresponding to the data flow graphs in FIGS. 3A and 3B are stored in advance in storage unit 10A, program storage unit 104 and storage unit 16A, as shown in FIGS. 4A to 4C.

Each of storage unit 10A and program storage unit 104 of input control unit 100 shown in FIGS. 4A and 4B stores two sets of program data PD1 and PD2 in a plurality of areas individually designated based on an address AD, respectively. Program data PD1 includes valid data D11 indicating whether or not program data PD1 is valid, instruction data D12 indicating an instruction code, node data D13 indicating destination information, and LR data D14 instructing to which one of input path on the left (L) and input path on the right (R) of a subsequent instruction node an output should be provided. Similarly, program data PD2 also includes valid data D12, instruction data D22, node data D23, and LR data D24.

Storage unit 16A in firing control unit 106 stores a table of constants 1503 in FIG. 4C. A plurality of records including valid data D41 and value data D42 are registered in advance in table of constants 1503. Each record is uniquely designated by address AD. Valid data D41 indicates whether or not the contents in the record are valid. Value data D42 indicates a value for a constant which is referred to for program execution.

Figure 3C:
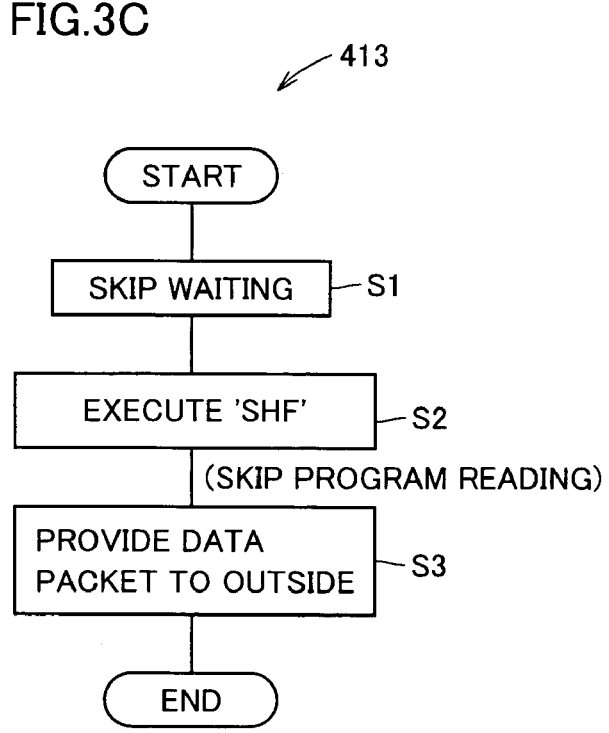

An operation when the program and data in FIGS. 4A to 4C stored in data-driven type information processor PE in FIG. 1 will now be described with reference to the flow graphs in FIGS. 3A and 3B as well as FIG. 3C as appropriate. FIG. 3C shows a processing at node 413 in FIG. 3B.

When data packet 110 having destination information 112 set to '0' is input to input control unit 100, program data PD1 alone in which valid data D11 among program data in an area of address AD=0 in storage unit 10A is 'valid' is read by addressing based on destination information 112 of data packet 110. Instruction data D12 of read program data PD1 is stored in field F1 of received data packet 110, and node data D13 and the LR data are stored in field F2. Thereafter, received data packet 110 is output from input control unit 100 and is provided through junction unit 101 to firing control unit 106, where input of data to be paired is waited (see node 201 in FIG. 3A).

When data packet 110 having destination information 112 set to '1' is input to input control unit 100, program data is read by addressing based on destination information 112 of data packet 110. Here, since valid data D11 and D21 in an area of address AD=1 of storage unit 10A are 'valid', program data PD1 and PD2 are read, and received data packet 110 is copied so as to produce two received data packets 110. Instruction data D12 of read program data PD1 is stored in field F1 of one of two received data packets 110. Node data D13 and the LR data are stored in field F2, and one data packet 110 is output. In addition, instruction data D22 of read program data PD2 is stored in field F1 of the other of received data packets 110. Node data D13 and the LR data are stored in field F2, and the other data packet 110 is output. Two output data packets 110 are provided through junction unit 101 to firing control unit 106, where input of data to be paired is waited (see node 202 in FIG. 3A).

Consequently, as firing control unit 106 detects input of two different data packets 110 storing the same destination information 112 ('n1'), data packet 110 storing the paired data is output to function processor 12. In function processor 12, an operation based on instruction code 111 ('mul') of received data packet 110 is performed in operation unit 1403, and data packet 110 storing a result of the operation is output to program storage unit 104 (see node 203 in FIG. 3A).

In program storage unit 104, in order to move the processing to module ('modl'), the program data is read by addressing based on destination information 112 ('n1') of received data packet 110. Here, as valid data D11 alone in an area of address AD=0 of program storage unit 104 is valid, program data PD1 alone is read. Instruction data D12 ('mul') of read program data PD1 is stored in field F1 of received data packet 110. Node data D13 ('n2') and the LR data are stored in field F2, and received data packet 110 is output from program storage unit 104. Output data packet 110 is provided through junction unit 101 to firing control unit 106. In this manner, data to be paired with data packet 110 that has been waiting is detected in firing control unit 106, and data packet 110 storing paired data is output to function processor 102.

An operation based on instruction code 111 ('mul') of received data packet 110 is performed in function processor 12, and data packet 110 storing a result of the execution is output to program storage unit 104.

In program storage unit 104, program data PD1 and PD2 in which valid data D11 and D22 indicate valid are read by addressing based on destination information 112 ('n2') of received data packet 110. Instruction data D22 of read program data PD2 indicates instruction code SHF. Here, the received data packet is copied so as to produce two data packets. Instruction data D12 ('add') of read program data PD1 is stored in field F1 of one of two received data packets 110. Node data D13 ('n3') and LR data D14 are stored in field F2, and one received data packet 110 is output. In addition, instruction code SHF of read program data PD2 is stored in field F1 of the other received data packet 110. Node data D23 ('n4'; note that this is a dummy value) representing the destination information and the LR data are stored in field F2, and the other received data packet 110 is output. Two output data packets are provided through branch unit 105 and junction unit 101 to firing control unit 106 (see node 408 in FIG. 3A).

When firing control unit 106 receives data packet 110 storing instruction code 'add', value data D42 (=3) is read from table for constants 1503 by addressing based on the destination information ('n1') of received data packet 110. Read value data D42 is additionally stored in field F5 of received data packet 110, and data packet 110 is output to function processor 12. In addition, when firing control unit 106 receives data packet 110 storing instruction code SHF, it is determined as an instruction code without necessitating waiting, and received data packet 110 is output to function processor 12 as it is (step S1 in FIG. 3C).

When function processor 12 receives data packet 110 storing instruction code SHF, operation unit 1404 sets HST flag 113 of received data packet 110 to '1' (step S2 in FIG. 3C). Thereafter, data packet 110 is provided to program storage unit 104. In program storage unit 104, a program is read by addressing based on destination information 112 ('n4') of received data packet 110. Here, destination information 112 ('n4') is not used. In other words, as instruction code D12 of the program read by addressing based on destination information 112 ('n4') indicates 'NOP' (no operation), data packet 110 of the instruction code passes through function processor 12 even if it enters function processor 12.

Branch unit 105 provides received data packet 110 to the outside of data-driven type information processor PE based on setting to '1' of HST flag 113 of received data packet 110 (step S3 in FIG. 3C). By executing the processings in steps S1 to S3, execution of the processing of instruction code SHF allocated to node 413 in FIG. 3B is completed. As the output (dumped) contents in data packet 110 indicate a state where a result of execution of the operation in accordance with the program from node 201 to node 408 is stored, debugging of the program from node 201 to node 408 is allowed by confirming the contents in output data packet 110.

If debugging of a program execution state from node 201 to node 408 is desired as shown in FIG. 4B, storage in program storage unit 102 should be such that instruction code SHF is read as the instruction code subsequent to instruction code ('mul') of node 408. Namely, the data flow program should be described in such a manner. Therefore, a portion in a program at which a data packet is to be dumped can directly be designated in an arbitrary manner.

In such a case, it is only necessary to utilize an operation to copy data packet 110 as described above, so as to add program data PD2 of instruction code SHF in an area of an identical address where program data PD1 of instruction code ('add') read subsequent to the instruction code ('mul') of node 408 is present. Therefore, program change can be minor and actual machine debugging can be facilitated.

In the description above, instruction code 'SHF' has been discussed. Alternatively, instruction code 'SSF' is also applicable and a similar effect can be obtained.

Figure 5:
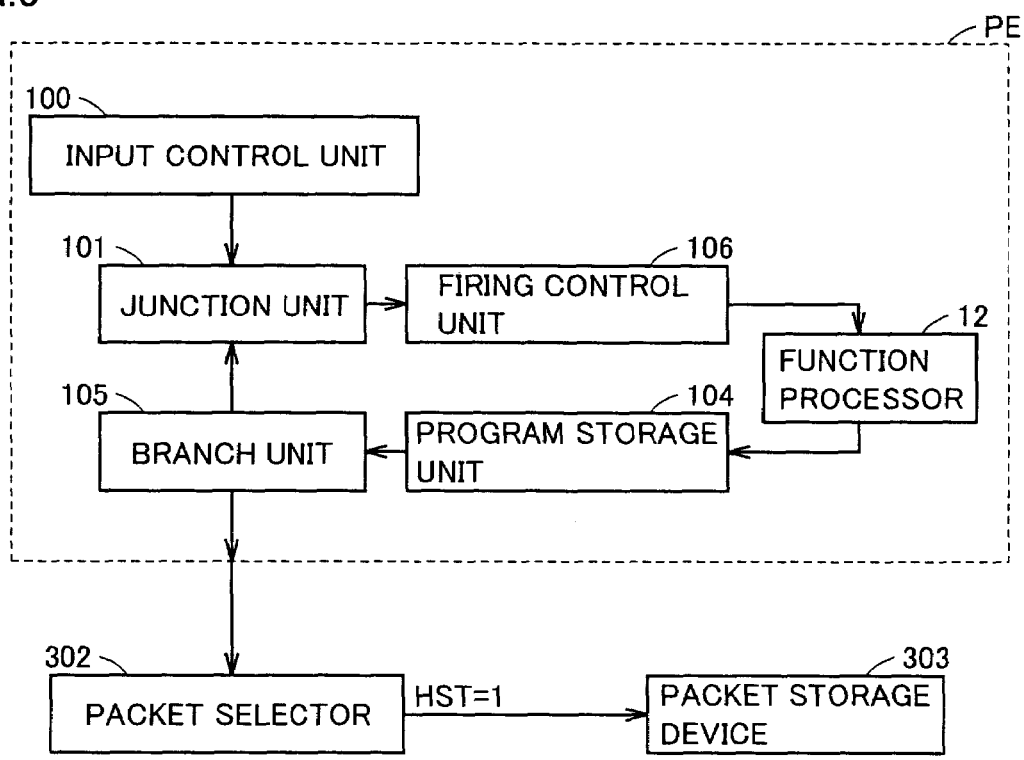
FIG. 5 shows a state in which a packet selector and a packet storage device are connected to the data-driven type information processor according to the present embodiment.

FIG. 5 shows a state in which a packet selector 302 and a packet storage device 303 are externally connected to data-drive type information processor PE. Upon receiving data packet 110 output from branch unit 105, packet selector 302 outputs received data packet 110 to packet storage device 303 if HST flag 113 of received data packet 110 is set to '1'. Packet storage device 303 receives provided data packet 110 and sequentially stores the same. Therefore, packet storage device 303 can accumulate data packet 110 dumped in response to instruction code SHF or instruction code SSF.

Figure 6:
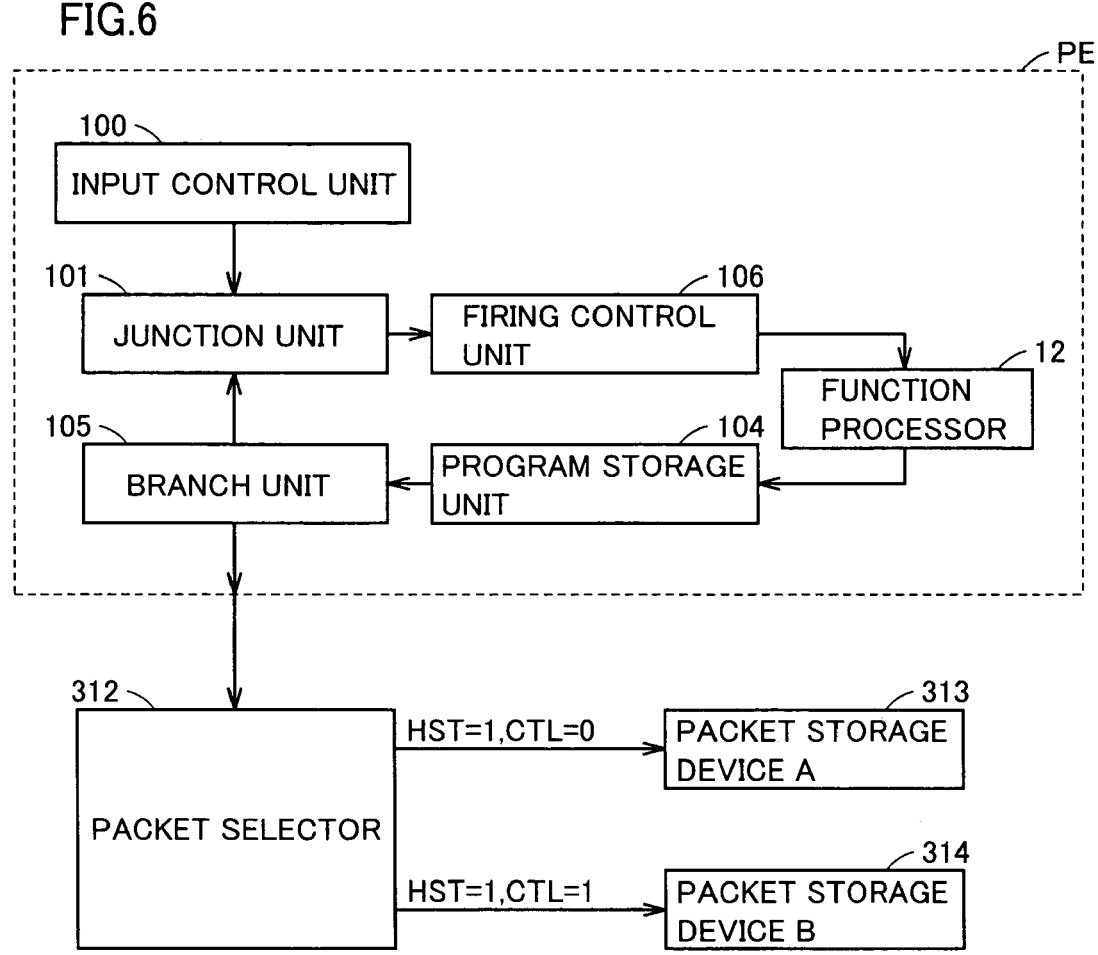
FIG. 6 shows a state in which a packet selector and two packet storage devices are connected to the data-driven type information processor according to the present embodiment.

FIG. 6 shows a state in which a packet selector 312 as well as packet storage devices 313 and 314 of which storage contents are readable are externally connected to data-drive type information processor PE. Upon receiving data packet 110 output from branch unit 105, packet selector 312 outputs received data packet 110 to packet storage device 313 if HST flag 113 of received data packet 110 is set to '1' and CTL flag 114 thereof is set to '0', while it outputs received data packet 110 to packet storage device 314 if HST flag is set to '1' and CTL flag 114 is set to '1'. Packet storage devices 313 and 314 receive provided data packet 110 and sequentially store the same. Therefore, packet storage device 313 can accumulate data packet 110 dumped in response to instruction code SHF, while packet storage device 314 can accumulate data packet 110 dumped in response to instruction code SSF. Debugged contents can readily be known by using another device reading the storage contents in packet storage devices 313 and 314 so as to present the read contents to the outside.

In this manner, devices storing dumped data packets 110 are different for each instruction code, thereby attaining the following effects, for example. Specifically, it is assumed that, when output data packet 110 of data-drive type information processor PE is accumulated in packet storage devices 313 and 314, data packet 110 of instruction code SHF accumulates data within the packet, whereas the data packet of instruction code SSF counts the number of arrivals. Then, instruction code SHF is used at a debug portion in the program requiring the contents in data packet 110, while instruction code SSF is used at a portion where solely the number of passing data packets 110 is to be counted. In this manner, necessary capacity of the packet storage device can be small, as compared with when all data packets are accumulated.

In the present embodiment, a function to dump a data packet is attained as a normal instruction that can be used in the data flow program. As such, with a minor program change, a result of dumping of data packet 10 at an arbitrary place in the program can be obtained. In addition, as solely a minor change is required in function processor 12, necessary cost can extremely be low.

Here, in order to distinguish between instruction code SHF and instruction code SSF, the CTL flag that has been used in the conventional data-drive type information processor is also used herein, however, the flag is not limited to the CTL flag. Alternatively, another flag that has conventionally been used may be employed, or another new flag may be added. If a larger number of flags are used, debugging at a larger number of portions can accordingly be facilitated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data-driven type information processor executing a data flow program controlling processing of input data, the data-driven type information processor receiving a data packet as the input data and carrying out processing on the data packet using the data flow program, the data packet having an instruction field storing instruction information, a destination field storing destination information and a data field storing data, comprising:
    a program storage unit receiving a first modified data packet, and outputting a second modified data packet obtained by modifying information of the received first modified data packet;
    a firing control unit receiving said second modified data packet, and outputting a third modified data packet obtained by modifying information of the received second modified data packet or the received second modified data packet;
    a function processor receiving said data packet output from said firing control unit, and outputting said first modified data packet obtained by modifying information of the received data packet; and
    an input/output unit providing said second modified data packet received from said program storage unit to outside of said data-driven type information processor or to said firing control unit based on the contents in the received second modified data packet; wherein
    said program storage unit i) receives said first modified data packet, ii) reads subsequent destination information and subsequent instruction information from said data flow program stored in advance by addressing based on the destination information of the received first modified data packet, iii) stores the subsequent destination information and the subsequent instruction information in the destination field and the instruction field of the received first modified data packet respectively, and iv) outputs the received first modified data packet as said second modified data packet,
    said firing control unit i) receives said data packet, ii) detects paired data based on the instruction information of the received data packet, iii) stores data pair in the data field of the received data packet, and iv) outputs the received data packet as said third modified data packet or outputs the received data packet as it is,
    said function processor i) receives the data packet from said firing control unit, ii) decodes the instruction information of the received data packet, iii) subjects contents in the received data packet to an operation processing based on a result of decoding, iv) stores a result of the operation in the received data packet, and v) outputs the received data packet as said first modified data packet to said program storage unit,
    said data packet further stores control information,
    said data flow program includes instruction information indicating a packet output instruction for holding the contents in the data packet and providing the data packet to the outside of said data-driven type information processor,
    said function processor has a packet output instruction processing unit setting said control information of the received data packet such that, when a transfer operation is instructed, transfer is instructed as said operation processing for said instruction information indicating said packet output instruction of said received data packet no matter what the subsequent instruction information instructed, and
    said input/output unit provides the received data packet to said outside when said control information of said received data packet indicates transfer.

2. The data-driven type information processor according to claim 1, wherein
    said program storage unit reads a plurality of pieces of said subsequent instruction information including instruction information indicating said packet output instruction and a plurality of pieces of said subsequent destination information by one said addressing, and outputs a plurality of said received data packets storing said plurality of pieces of said subsequent instruction information that have been read and said plurality of pieces of said subsequent destination information that have been read in said instruction field and said destination field respectively, and
    said plurality of pieces of said subsequent instruction information that have been read include instruction information indicating said packet output instruction.

3. The data-driven type information processor according to claim 1, wherein
    said packet output instruction is categorized into a plurality of types,
    said control information includes identification data for identifying the type of said packet output instruction, and
    said packet output instruction processing unit sets said identification data of the received data packet in accordance with the type of said packet output instruction indicated by said result of decoding of the instruction information of said received data packet.

4. The data-driven type information processor according to claim 3, wherein
    said outside serving as output destination is implemented by a plurality of readable storage devices adapted to respective ones of said plurality of types of packet output instructions.

5. The data-driven type information processor according to claim 1, wherein
    said outside serving as the output destination is implemented by a readable storage device receiving and storing provided said data packet.

6. A method of controlling execution of a data flow program in a data-driven type information processor executing the data flow program to control processing of input data, the data-driven type information processor receiving a data packet having an instruction field storing instruction information, a destination field storing destination information and a data field storing data, wherein
    said data-driven type information processor includes
    a program storage unit receiving a first modified data packet, and outputting a second modified data packet obtained by modifying information of the received first modified data packet;
    a firing control unit receiving said second modified data packet, and outputting a third modified data packet obtained by modifying information of the received second modified data packet or the received second modified data packet;

a function processor receiving said data packet output from said firing control unit, and outputting said first modified data packet obtained by modifying information of the received data packet; and an input/output unit providing said second modified data packet received from said program storage unit to outside of said data-driven type information processor or to said firing control unit based on the contents in the received second modified data packet; wherein said program storage unit i) receives said first modified data packet, ii) reads subsequent destination information and subsequent instruction information from said data flow program stored in advance by addressing based on the destination information of the received first modified data packet, iii) stores the subsequent destination information and the subsequent instruction information in the destination field and the instruction field of the received first modified data packet respectively, and iv) outputs the received first modified data packet as said second modified data packet, said firing control unit i) receives said data packet, ii) detects paired data based on the instruction information of the received data packet, iii) stores data pair in the data field of the received data packet, and iv) outputs the received data packet as said third modified data packet or outputs the received data packet as it is, said function processor i) receives the data packet from said firing control unit, ii) decodes the instruction information of the received data packet, iii) subjects contents in the received data packet to an operation processing based on a result of decoding, iv) stores a result of the operation in the received data packet, and v) outputs the received data packet as said first modified data packet to said program storage unit, said data packet further stores control information, and said data flow program includes instruction information indicating a packet output instruction for holding the contents in the data packet and providing the data packet to the outside of said data-driven type information processor, said method of controlling execution of said data flow program comprises:

setting said control information of the received data packet such that, when a transfer operation is instructed, transfer is instructed as said operation processing in accordance with indication of said packet output instruction by said result of decoding of the instruction information of said received data packet in said function processor no matter what the subsequent instruction information instructed; and providing the received data packet to said outside in accordance with indication of transfer by said control information of said received data packet in said input/output unit.

* * * * *